US007643483B2

United States Patent
Erwin et al.

(10) Patent No.: US 7,643,483 B2
(45) Date of Patent: Jan. 5, 2010

(54) SYSTEM AND METHOD FOR USING A HOP LIMITED CAST FOR INTERNET EGRESS POINT SELECTION

(75) Inventors: Jeff Baird Erwin, Sammamish, WA (US); Stephen Thomas Kelly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 10/996,769

(22) Filed: Nov. 24, 2004

(65) Prior Publication Data

US 2006/0109790 A1    May 25, 2006

(51) Int. Cl.
*H04L 12/56* (2006.01)
(52) U.S. Cl. .................. 370/392; 370/400; 709/227; 709/245
(58) Field of Classification Search ........... 370/238, 370/351, 392, 400, 408; 709/227, 228, 245
See application file for complete search history.

(56) References Cited

U.S. PATENT DOCUMENTS

| | | | | |
|---|---|---|---|---|
| 6,122,743 | A | 9/2000 | Shaffer et al. ................ 726/3 |
| 6,501,756 | B1 * | 12/2002 | Katsube et al. .............. 370/392 |
| 6,728,232 | B2 * | 4/2004 | Hasty et al. ................. 370/338 |
| 6,791,949 | B1 | 9/2004 | Ryu et al. .................... 370/254 |
| 6,836,463 | B2 | 12/2004 | Garcia Luna-Aceves et al. .................... 370/238 |
| 6,842,462 | B1 | 1/2005 | Ramjee et al. ............... 370/466 |
| 6,944,159 | B1 * | 9/2005 | Fotedar et al. .............. 370/392 |
| 6,965,575 | B2 | 11/2005 | Srikrishna et al. ........... 370/252 |
| 6,982,966 | B2 | 1/2006 | Eidenschink et al. ........ 370/322 |
| 7,058,021 | B2 | 6/2006 | Srikrishna et al. ........... 370/252 |
| 7,085,241 | B1 | 8/2006 | O'Neill et al. .............. 370/254 |
| 7,099,286 | B1 * | 8/2006 | Swallow .................... 370/255 |
| 7,111,163 | B1 | 9/2006 | Haney ....................... 713/153 |
| 7,251,238 | B2 | 7/2007 | Joshi et al. ................. 370/338 |
| 7,263,070 | B1 * | 8/2007 | Delker et al. ............... 370/254 |
| 7,280,483 | B2 | 10/2007 | Joshi ......................... 370/238 |
| 7,283,529 | B2 | 10/2007 | Basso ........................ 370/392 |

(Continued)

OTHER PUBLICATIONS

Office Action mailed Dec. 12, 2007, U.S. Appl. No. 10/997,318, filed Nov. 24, 2004. entitled "System and Method for Expanding the Range of a Mesh Network".
Office Action mailed Jan. 11, 2008, U.S. Appl. No. 11/000,232, filed Nov. 29, 2004, entitled "System and Method for Dynamic Egress Routing Through a Single Default Gateway in a Mesh Network".
Official Action in U.S. Appl. No. 11/000,232 dated Aug. 1, 2008.
Official Action in U.S. Appl. No. 10/997,318 dated Dec. 17, 2008.

(Continued)

*Primary Examiner*—William Trost, IV
*Assistant Examiner*—Roberta A Shand
(74) *Attorney, Agent, or Firm*—Merchant & Gould; Ryan T. Grace (57) ABSTRACT

A system and method for using a hop limited cast for Internet egress point selection. One aspect of the present invention includes a computer-implemented method. The computer-implement method includes casting an Internet egress announcement to a network. The announcement has a range associated therewith. A list is then created with discovered Internet egress points within the range. Another aspect of the present invention includes an egress mesh node with an Internet egress point. The egress mesh node is configured to cast an Internet egress announcement to a range of the network.

13 Claims, 5 Drawing Sheets

U.S. PATENT DOCUMENTS

| | | | |
|---|---|---|---|
| 7,315,548 B2 | 1/2008 | Joshi | 370/401 |
| 7,376,087 B2 | 5/2008 | Srikrishna | 370/238 |
| 7,382,759 B2 | 6/2008 | Joshi et al. | 370/338 |
| 7,394,756 B1 | 7/2008 | Cook | 370/216 |
| 2001/0036161 A1 | 11/2001 | Eidenschink et al. | 370/316 |
| 2003/0117954 A1 | 6/2003 | De Neve et al. | 370/230 |
| 2003/0137930 A1* | 7/2003 | Futernik | 370/216 |
| 2003/0179742 A1* | 9/2003 | Ogier et al. | 370/351 |
| 2003/0204619 A1 | 10/2003 | Bays | 709/238 |
| 2004/0128345 A1* | 7/2004 | Robinson et al. | 709/203 |

* cited by examiner

SYSTEM AND METHOD FOR USING A HOP LIMITED CAST FOR INTERNET EGRESS POINT SELECTION

CROSS-REFERENCE TO RELATED APPLICATIONS

The present invention is related to a patent application having Ser. No. 11/000,232, entitled: "System and Method for Dynamic Egress Routing Through a Single Default Gateway on a Mesh Network", filed concurrently with this application. The present invention is also related to a patent application having Ser. No. 10/997,318, entitled: "System and Method for Expanding the Range of a Mesh Network", filed concurrently with this application. The related applications are assigned to the assignee of the present patent application and are hereby incorporated by reference.

BACKGROUND OF THE INVENTION

Wireless communication between devices is becoming a more prevalent and accepted method of providing network communication. Wireless communication may take place on a mesh network comprised of mesh boxes or mesh-configured computing devices referred to as mesh nodes. A mesh network is a network topology in which mesh nodes are connected by self-forming connections as mesh nodes enter the network. In a large-scale well-connected mesh network, users expect to access any part of the mesh network from any other part of the mesh. Stated another way, users want to access the same resources from their desktop at home, from their laptop, from a coffee shop, from a kiosk at the library, or from a tablet at school. Assuming all the locations are connected to the same mesh network, this expectation of connectivity is reasonable.

Wireless communication, however, may have several limitations that effect communication on a mesh network. These limitations may arise from the routing protocol of the mesh network. In order to communicate information between two distant mesh nodes, mesh nodes route through intermediate mesh nodes. A data packet routed through a mesh node is generally referred to as a hop. For example, if a data packet must traverse two mesh nodes before reaching a destination mesh node, the data packet will make three hops. Also, a data packet may have several paths through the mesh available for routing. Each of the several paths may have different connectivity. For example, one path may require a data packet to make eight hops while another path may only require two hops. In general, as hops on the mesh increase, latency increases; hence, the communication path between two mesh nodes cannot practically scale beyond a limited number of hops before connectivity falls below user expectations. Accordingly, there exists a need to identify the path through a mesh network with the fewest number of hops in order to minimize latency for devices communicating on a mesh network.

SUMMARY OF THE INVENTION

Aspects of the present invention relate to a system and method for using a hop limited cast for Internet egress point selection. One aspect of the present invention includes computer-implemented method for discovering Internet egress points on a network. The computer-implement method includes casting an Internet egress announcement to a network. The announcement has a range associated therewith. A list is then created with discovered Internet egress points within the range.

Another aspect of the present invention includes a computer-readable medium that has computer-executable instructions for discovering Internet egress points on a network. The instructions comprise casting an Internet egress announcement that identifies an Internet egress point. The announcement is cast to a range of the network; and a list is created of discovered Internet egress points through reception of the announcement.

Yet another aspect of the present invention includes a system for discovering Internet egress points in a network. The system has an egress mesh node with an Internet egress point. The egress mesh node is configured to cast an Internet egress announcement to a range of the network. These and other embodiments will be evident as more fully set forth in the detailed description and claims below.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
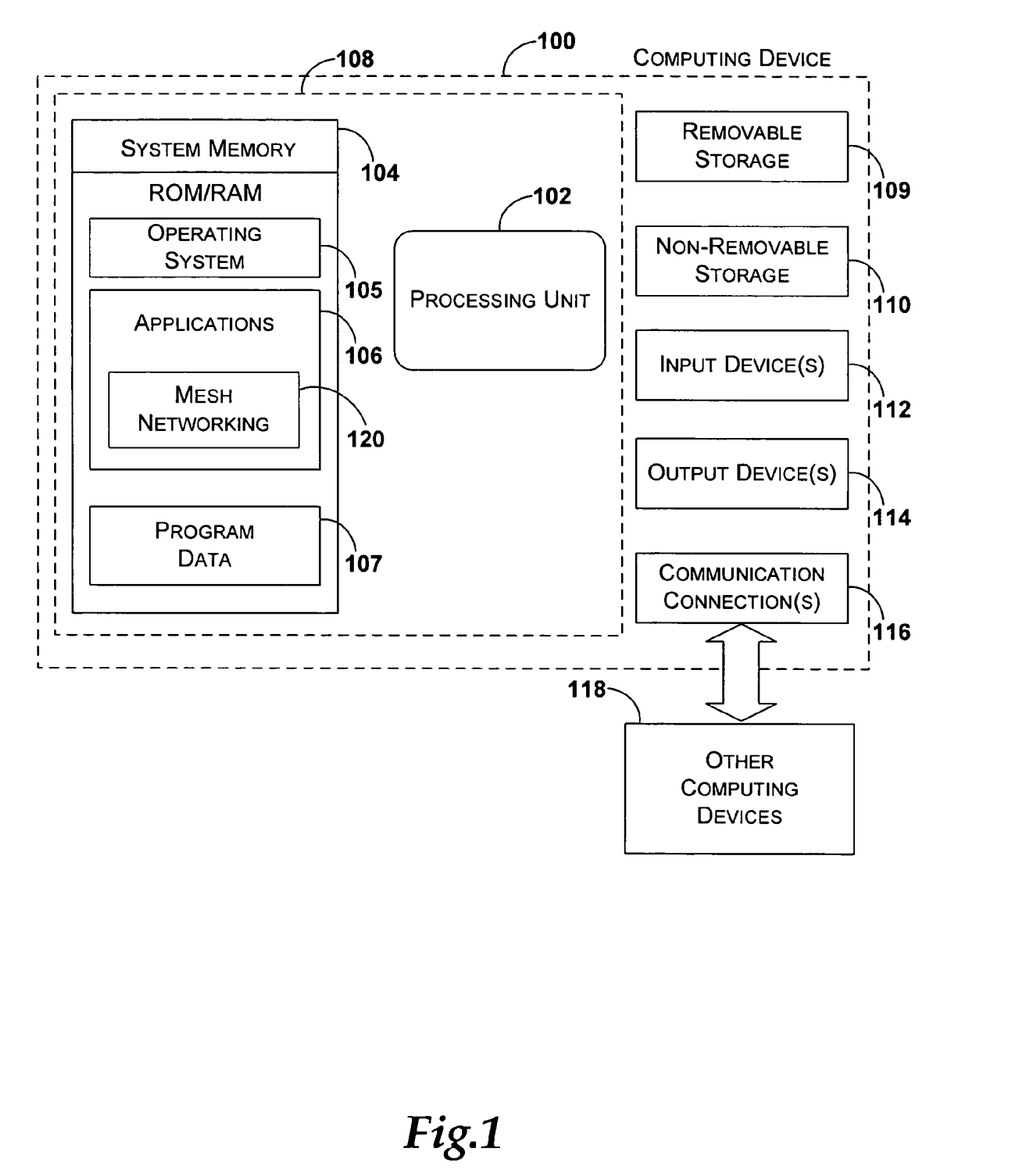
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for implementing mesh networking functionality in accordance with the present invention. The functionality represented by application 120 may be further supported by additional input devices, 112, output devices 114, and communication connection(s) 116 that are included in computing device 100 for establishing and maintaining a mesh network.

Figure 2:
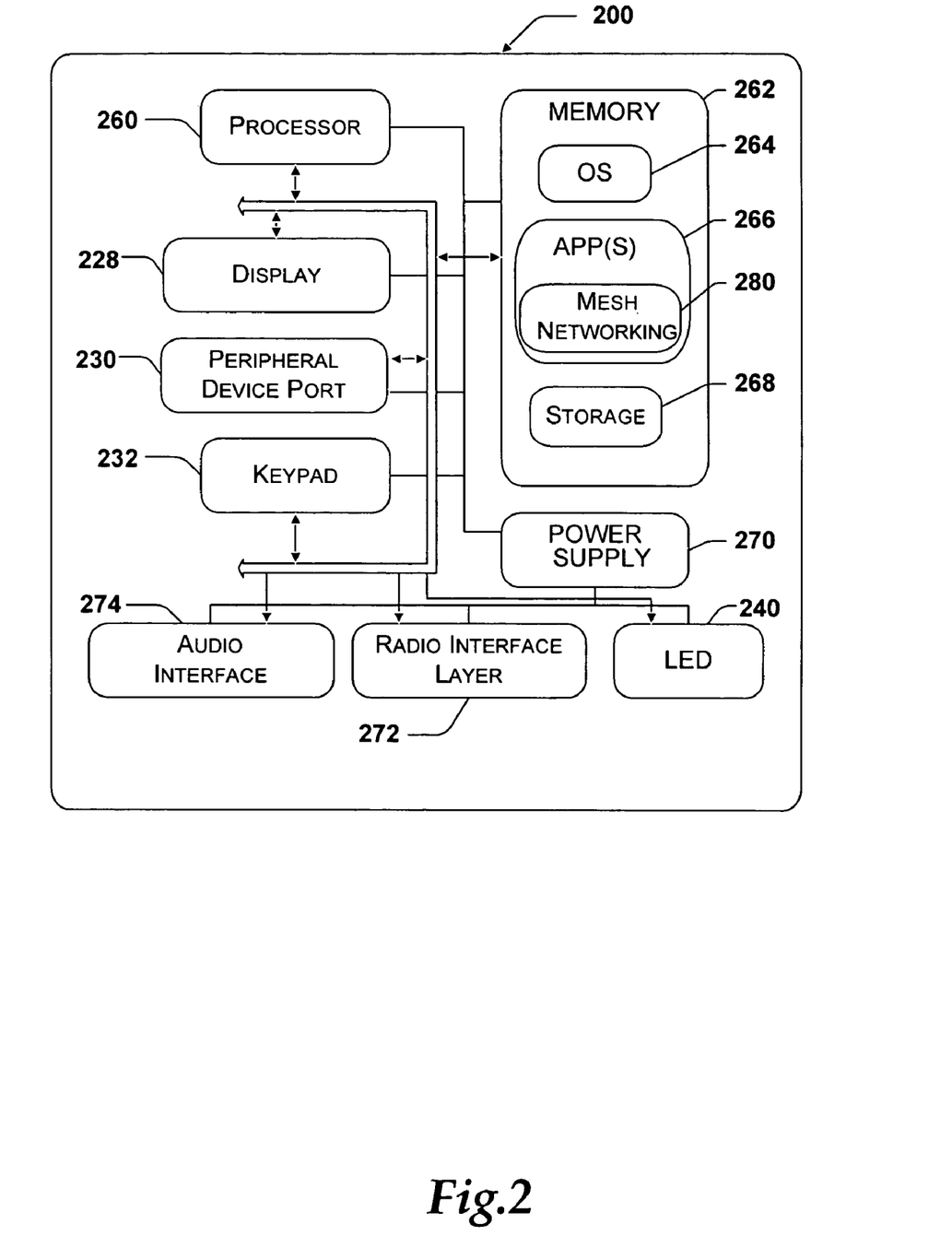
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

In one embodiment, applications 266 further include an application 280 for implementing mesh networking functionality in accordance with the present invention. The functionality represented by application 280 may be further supported by structure in radio interface layer 272 that is included in mobile device 200 for establishing and maintaining a mesh network.

Figure 3:
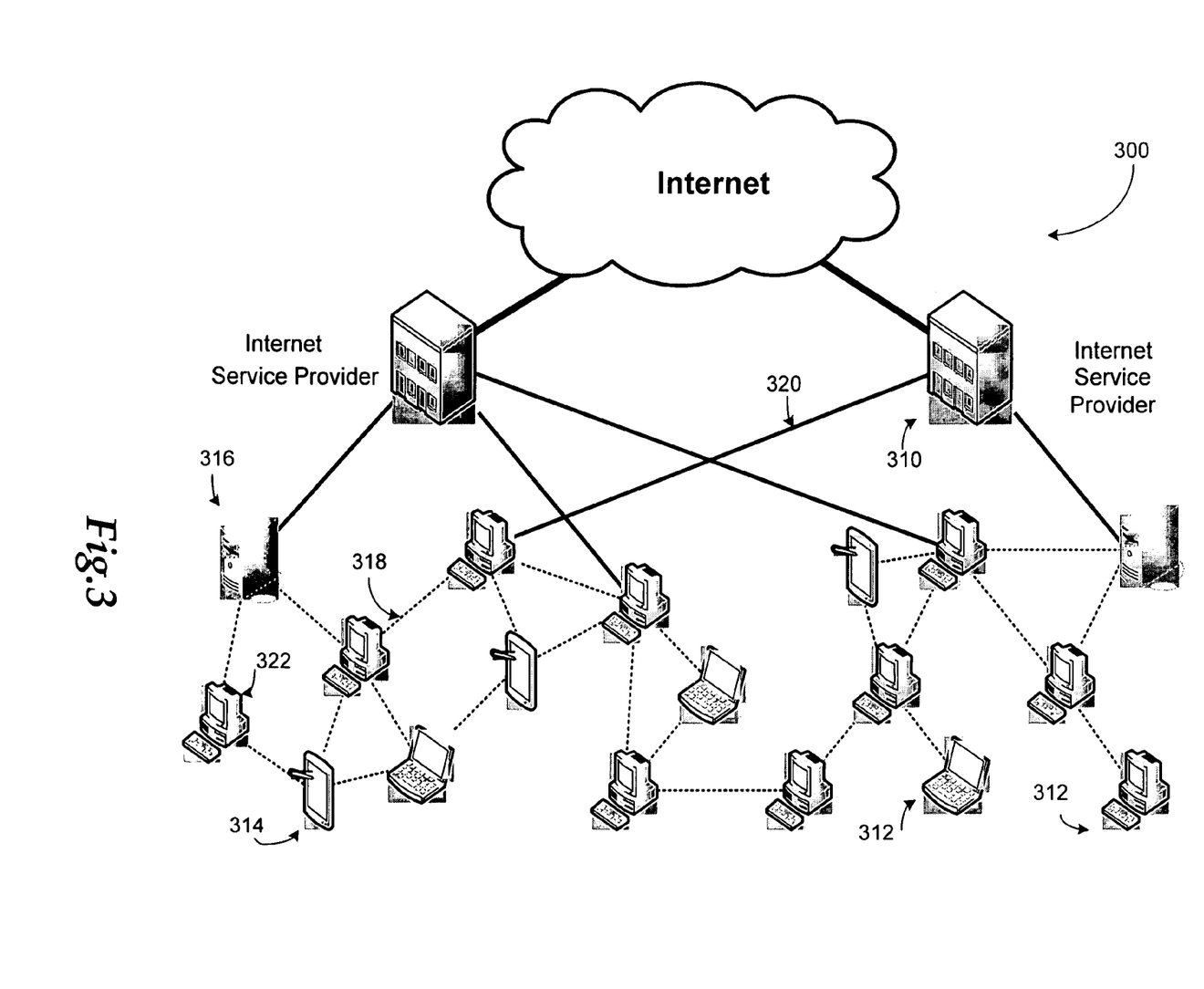
FIG. 3 illustrates an exemplary mesh network that may be used in one exemplary embodiment of the present invention.

FIG. 3 illustrates a mesh network 300 that may be used in one exemplary embodiment of the present invention. Mesh network 300 may comprise any topology of mesh nodes, Internet service providers and communication media. Also, the mesh network 300 may have a static or dynamic topology without departing from the spirit and scope of the present invention.

The mesh network 300 includes one or more Internet service providers 310, which provide Internet access points for one or more mesh nodes. Each mesh node may comprise any device that is connected to the mesh network 300. The mesh node may transmit and receive data packets and also may pass data packets to other mesh nodes in accordance with the routing protocol of the mesh network 300. The mesh node may be a fixed device or a mobile device. For example, the mesh node may include a computing device 312 that is similar to computing device 100 described above in conjunction with FIG. 1. The mesh node may also include a mobile computing device 314 that may be similar to mobile computing device 200 described above in conjunction with FIG. 2. Other embodiments may include other configurations of mesh nodes. For example, a mesh node may include a dedicated computer that only routes data packets from one mesh node to another such as the mesh box 316.

In one exemplary embodiment of the present invention, the mesh network 300 has a network topology in which mesh nodes are connected with several redundant connections between the mesh nodes. The mesh network 300 may include a full mesh where every mesh node is connected to every other mesh node in the mesh network. Mesh network 300 may also include a partial mesh topology where some mesh nodes are organized in a full mesh and other mesh nodes are only connected to one or two other mesh nodes. Other mesh topologies may include one or more subnets connected to the mesh network. These subnets may have a plurality of clients connected thereto. The various topologies for the mesh network 300 are endless and will not be further set forth herein.

Reference number 318 indicates communication media between the mesh nodes. By way of example, and not limitation, communication media 318 may include wired media such as a wired network or direct-wired connection, and wireless media such as acoustic, RF, infrared and other wireless media. Reference number 320 indicates communication media between Internet service provider 310 and one or more of the mesh nodes. The communication media 320 may include wired media such as a wired network or direct-wired connection, and wireless media such as acoustic, RF, infrared and other wireless media.

In the mesh network 300, mesh nodes may transmit and receive data packets from other mesh nodes and/or from the Internet. Routing tables typically determine what path a data packet traverses through the mesh network. The routing of a data packet is commonly determined at a source node. Stated another way, the node sending a data packet may determine the route a data packet takes through the mesh network. A data packet routed from a mesh node to reach another mesh node is typically referred to as a "hop." For example, if mesh node 314 desires to transmit a data packet to mesh node 316, the routing tables accessible to mesh node 314 may indicate routing will take place through mesh node 322. Accordingly, the data packet will make two hops (node 314 to node 322 and node 322 to node 316). In general, latency increases proportionally with the number of hops a data packet must make to reach a mesh node. Also, routing tables may indicate several available paths for a data packet to traverse to reach a destination. Routing tables may also indicate that a destination mesh node is inaccessible because the number of hops is too great. Therefore, it is advantageous for each node to have access to routing tables with the most optimal path between nodes. It is also advantageous for each node to have access to routing tables that provide greater access to the mesh network.

Figure 4:
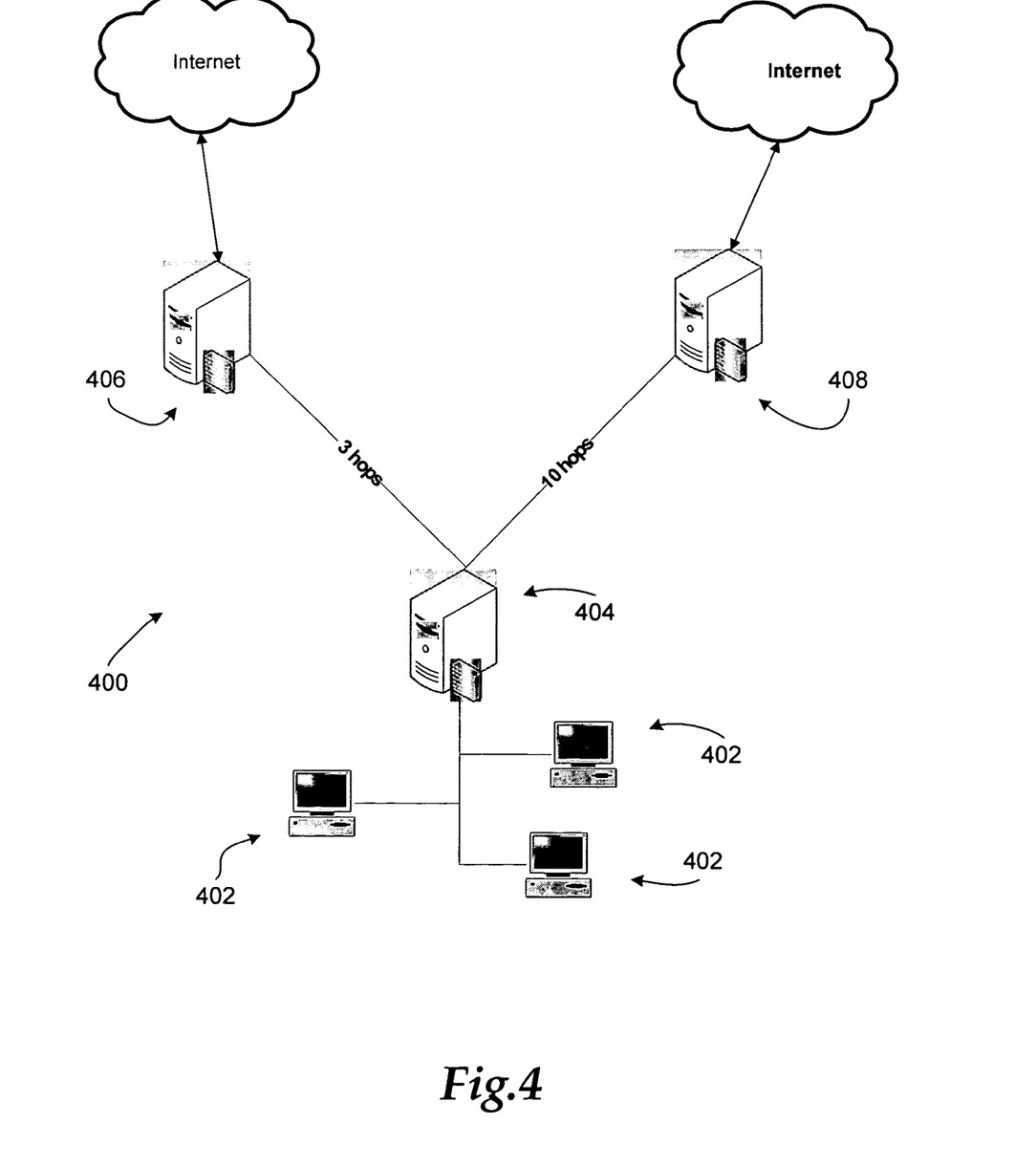
FIG. 4 illustrates an exemplary mesh network that may be used in one exemplary embodiment of the present invention

Illustrative Embodiments of Internet Egress Point Selection Using a Hop Limited Cast FIG. 4 illustrates an exemplary mesh topology for one embodiment of the present invention. As stated above, the mesh network may have various topologies without departing from the spirit and scope of the present invention. The mesh topology schema in FIG. 4 is for exemplary and explanatory purposes only and not for purposes of limiting the scope of the present invention as will be fully set forth in the claims below.

Mesh network 400 includes mesh nodes 404, 406 and 408. Mesh node 404 is referred to herein as internal mesh node 404 in that it does not have a direct Internet egress point. Mesh nodes 406 and 408 are referred to herein as egress mesh nodes in that they provide Internet egress points for the mesh network.

The internal mesh node 404 may have a subnet connected thereto. The subnet may have one or more clients 402 that are connected to the mesh network 400 by the internal mesh node 404. Clients 402 may include any type of computing device or mobile computing device capable of communication with a network. Also, the subnet may include any type of topology as set forth above in conjunction with FIG. 3. When clients 402 attempt to communicate with the Internet, the clients 402 use the internal mesh node 404 to route data packets through the mesh. The internal mesh node 404 determines how to route communications between the clients 402 and the Internet.

Routing on the mesh network 400 may take place at the MAC layer (Media Access Control) of an OSI framework (Open System Interconnection). Protocols at the MAC layer may be selected to limit the number of hops a data packet can travel on a mesh network. For example, this limit may be selected as eight hops. Therefore, internal mesh node 404 may only route data packets to nodes that are a maximum of eight hops away from the internal mesh node 404. In such an example, internal mesh node 404 would not be able to route data packets to egress mesh node 408. Even though an eight-hop limit is used herein, the hop limit may be any number. Moreover, even though routing is described herein with reference to MAC layer protocol, any routing protocol may be used without departing from the spirit and scope of the present invention.

As indicated in FIG. 4, internal mesh node 404 has two possible routes to the Internet. Internal mesh node 404 may either transverse egress mesh node 406 or 408 to reach the Internet. If data packets are sent to egress mesh node 406, the data packets must make three hops. If data packets are sent to egress mesh node 408, the data packets must make ten hops.

Before internal mesh node 404 can determine the optimal path, internal mesh node 404 must recognize that egress mesh node 406 and 408 are part of the mesh network 400. Also, internal mesh node 404 must recognize that egress mesh node 406 and 408 have Internet egress points. In order to announce presence on the mesh network 400, egress mesh nodes 406 and 408 cast an announcement through the mesh network. This announcement may have a range associated therewith so that only mesh nodes within a certain range of the egress mesh node receive the announcement. Internal mesh node 404 may then receive the message if internal mesh node 404 is within range. Internal mesh node 404 may then determine the optimal route to the Internet by comparing information received via the announcements of mesh nodes 406 and 408. The process of casting an announcement through the mesh network 400 is further described below in conjunction with FIG. 5.

Figure 5:
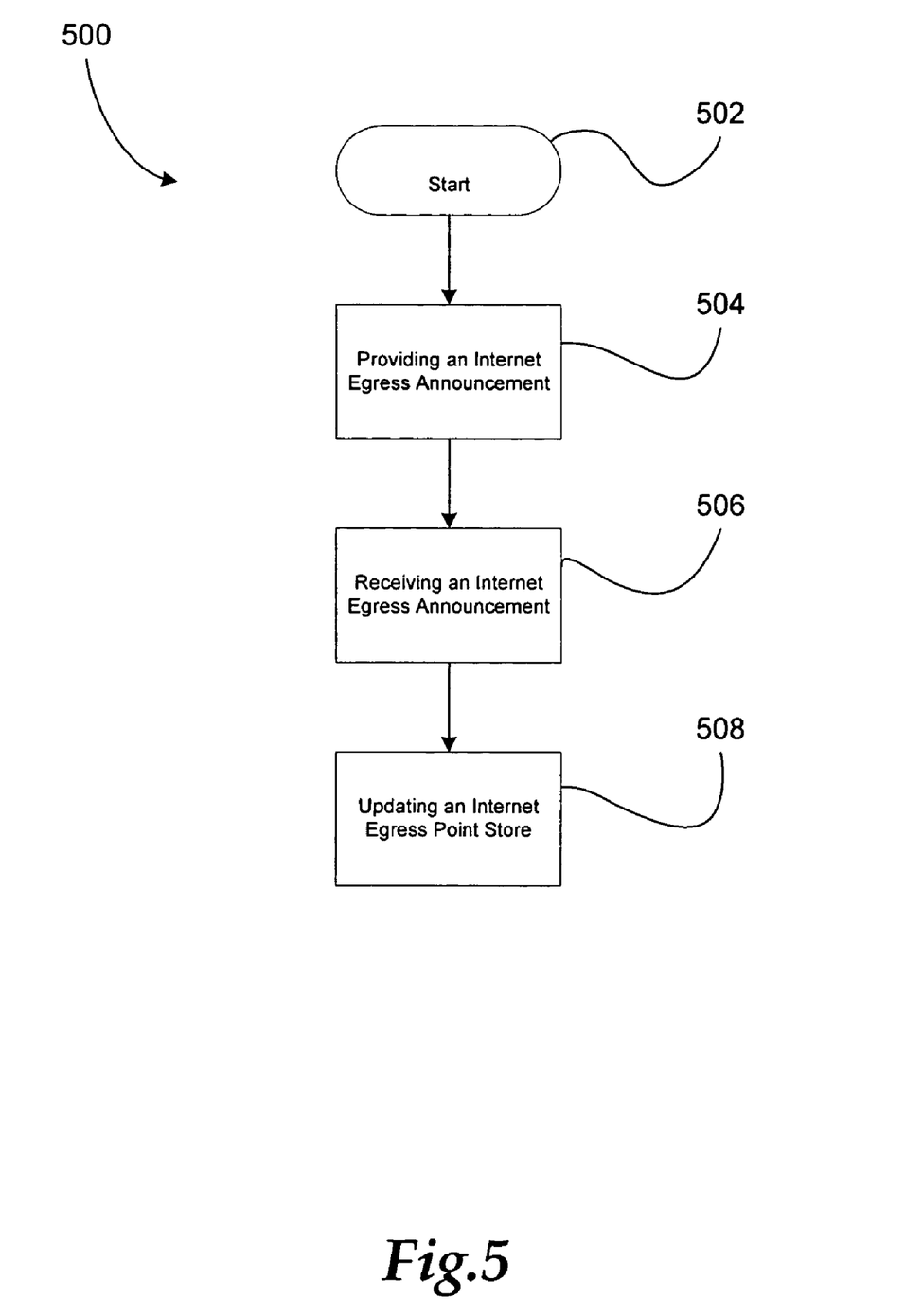
FIG. 5 illustrates a logical flow diagram of one process of the present invention.

FIG. 5 represents a logical flow diagram of the present invention. The process 500 starts at starting block 502 and continues to block 504 where an Internet egress announcement is cast. The announcement is cast from an egress mesh node having an Internet egress point. The announcement may include any type of message or notice capable of being received by another mesh node on a mesh network. The announcement includes data that identifies an egress mesh node as having an Internet egress point. The announcement may further include the Internet Protocol ("IP") address of the Internet egress point. The announcement may also include the name of the Internet service provider and the performance capabilities of the Internet connection. Such performance capabilities may include the uplink and downlink capability of the Internet connection. The performance capabilities may also include the current traffic volume, interference or load on the Internet connection. Generally the announcement may include any data that facilitates identification and/or reveals the characteristics of the Internet egress point.

The announcement may be cast using a variety of protocols. For example, the cast may be a broadcast where the same announcement is sent to multiple recipients. The announcement may also be a multicast or narrowcast where the announcement is sent to a select set of recipients. The cast may further include an anycast where the announcement is sent to the nearest set of recipients. Also, the cast may include a unicast where the announcement is sent to a single recipient. Generally, the cast includes any type of transmission from the Internet egress point to the mesh network.

In one embodiment, the announcement also includes a cast range. A cast range may be set to associate appropriateness with the announcement. For example, egress mesh node 408 is ten hops away from internal mesh node 404. It may be determined that internet egress points more than eight hops away are not viable because the quality of connectivity past eight hops is too low. Accordingly, internal mesh node 404 may not need to know that egress mesh node 408 exists because transmission quality would be unsatisfactory if data packets were routed to egress mesh node 408. In such a situation, the announcement of egress mesh node 408 will not need to reach internal mesh node 404. Setting the cast range prevents resources from being dedicated to mapping routes to Internet egress routes that are not viable.

The cast range may also take advantage of the MAC layer protocol. As stated above, protocol at the MAC layer may be used to limit the number of hops a data packet can travel. Data packets sent from mesh nodes further than the hop limit from the Internet egress point cannot reach the Internet egress point.

To set the cast range of the announcement, the announcement may include a time to live cast. For example, with an eight-hop limit, the announcement has a time to live of eight. At the announcements origin the time to live will be eight. The time to live cast will subtract from eight at each hop. When the time to live reaches zero, the announcement will discontinue its cast. It is also contemplated that the casting may not include a range. Advancements in technology may increase the conductivity of networks, mesh networks and/or wireless mesh networks. Also, it is contemplated that any number of routing protocols may be used for routing. A mesh node may, therefore, have access to any Internet egress point and the announcement may be cast throughout the entire network.

Block 506 indicates the step of receiving the Internet egress announcement. After the announcement is cast, mesh nodes on the network may receive the announcement. If there is a range associated with the announcement, mesh nodes within the range will receive the announcement and mesh nodes outside the range will not. The mesh nodes within the casting range will be aware of the Internet egress point for routing data packets to the Internet.

Block 508 indicates the step of updating an Internet egress point store. A mesh node may receive a plurality of announcements from a plurality of Internet egress points. The data associated with the announcement may be stored in an Internet egress point store for further evaluation when routing is required.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for discovering internet egress points on a network, comprising:
   providing a mesh network having an internal mesh node device and a plurality of respective egress mesh node devices, wherein the internal mesh node device does not have an internet egress point, wherein each of the respective egress mesh node devices have a respective internet egress point;
   casting, from each of the respective egress mesh node devices, an announcement, wherein each of the announcements indicate that the respective egress mesh node device has an internet egress point, an Internet Protocol address of the respective egress mesh node device, an internet service provider indicator associated with the respective egress mesh node device and performance capabilities of the internet service provider associated with the respective egress mesh node device, wherein the performance capabilities of the internet service provider include a current traffic volume, an interference level, and a load, wherein each of the announcements is a time to live cast that discontinues casting when the cast has traveled a predetermined number of hops within the mesh network, wherein the predetermined number of hops is a range that corresponds to media access control layer protocol, wherein internal mesh node devices within the predetermined number of hops receive the announcement and internal mesh node devices not within the predetermined number of hops do not receive the announcement; and
   when the internal mesh node device is within the predetermined number of hops, updating a routing table on the internal mesh node device with the indication of the internet egress point of the respective egress mesh node device, the Internet Protocol address of the respective egress mesh node device, the internet service provider indicator associated with the respective egress mesh node device and the performance capabilities of the internet service provider associated with the respective egress mesh node device.

2. The computer-implemented method of claim 1, wherein casting includes casting the announcement according to at least one member of a group comprising: a broadcast, a multicast, a unicast, and an anycast.

3. The computer-implemented method of claim 1, wherein the predetermined number of hops includes a range of the entire mesh network.

4. A computer-readable storage medium having computer executable instructions for discovering internet egress points on a network, comprising:
   receiving a cast from an egress mesh node, where in the cast is configured with an announcement, wherein the announcement indicates that the egress mesh node has an internet egress point, indicates an Internet Protocol address of the egress mesh node, indicates an internet service provider indicator associated with the egress mesh node and indicates performance capabilities of the internet service provider associated with the egress mesh node, wherein the announcement is a time to live cast that discontinues casting when the cast has traveled a predetermined number of hops within the mesh network;
   updating a routing table on the internal mesh node with the indication of the internet egress point of the egress mesh node, the indication of the Internet Protocol address of the egress mesh node, the indication of the internet service provider indicator associated with the egress mesh node and the indication of the performance capabilities of the internet service provider associated with the egress mesh node.

5. The computer-readable storage medium of claim 4, wherein the performance capabilities include at least one member of a group comprising: current traffic volume, interference, and load.

6. The computer-readable storage medium of claim 4, wherein the cast is at least one member of a group comprising: a broadcast, a multicast, a unicast, and an anycast.

7. The computer-readable storage medium of claim 4, wherein the predetermined number of hops includes a range of an entire mesh network.

8. The computer-readable storage medium of claim 4, wherein the predetermined number of hops includes a range that corresponds to media access control layer protocol.

9. A mesh network system, the system comprising:
   a mesh network;
   a first egress mesh node located within the mesh network and having a first internet egress point, wherein the first egress mesh node is configured to cast a first announcement, wherein the first announcement indicates that the first egress mesh node has a first internet egress point, indicates an Internet Protocol address of the first egress mesh node, indicates an internet service provider indicator associated with the first egress mesh node and indicates performance capabilities of the internet service provider associated with the first egress mesh node, wherein the first announcement is a time to live cast that discontinues casting when the cast has traveled a predetermined number of hops within the mesh network;
   a second egress mesh node located within the mesh network and having a second internet egress point, wherein the second egress mesh node is configured to cast a second announcement, wherein the second announcement indicates that the second egress mesh node has a second internet egress point, indicates an Internet Protocol address of the second egress mesh node, indicates an internet service provider indicator associated with the second egress mesh node and indicates performance capabilities of the internet service provider associated with the second egress mesh node, wherein the second announcement is a time to live cast that discontinues casting when the cast has traveled a predetermined number of hops within the mesh network;
   an internal mesh node located within the mesh network not having an internet egress point, wherein the internal mesh node is configured to receive the first announcement when the internal mesh node is within the predetermined number of hops of the first announcement, wherein the internal mesh node is configured to receive the second announcement when the internal mesh node is within the predetermined number of hops of the second announcement, wherein the internal mesh node is not configured to receive the first announcement when the internal mesh node is not within the predetermined number of hops of the first announcement, wherein the internal mesh node is not configured to receive the second announcement when the internal mesh node is not within the predetermined number of hops of the second announcement, wherein when the internal mesh node is within the predetermined number of hops of the first announcement, the internal mesh node is further configured to update a routing table on the internal mesh node with the indication of the internet egress point of the first egress mesh node, the indication of the Internet Protocol address of the first egress mesh node, the indication of the internet service provider indicator associated with the first egress mesh node and the indication of the performance capabilities of the internet service provider associated with the first egress mesh node, wherein when the internal mesh node is within the predetermined number of hops of the second announcement, the internal mesh node is further configured to update a routing table of the internal mesh node with the indication of the internet egress point of the second egress mesh node, the indication of the Internet Protocol address of the second egress mesh node, the indication of the internet service provider indicator associated with the second egress mesh node and the indication of the performance capabilities of the internet service provider associated with the second egress mesh node.

10. The mesh network system of claim 9, wherein the performance capabilities include at least one member of a group comprising: current traffic volume, interference, and load.

11. The mesh network system of claim 9, wherein casting includes casting the announcement according to at least one member of a group comprising: a broadcast, a multicast, a unicast, and an anycast.

12. The mesh network system of claim 9, wherein the predetermined number of hops includes a range of the entire mesh network.

13. The mesh network system of claim 9, wherein the predetermined number of hops includes a range that corresponds to media access control layer protocol.

* * * * *